Figure 3:
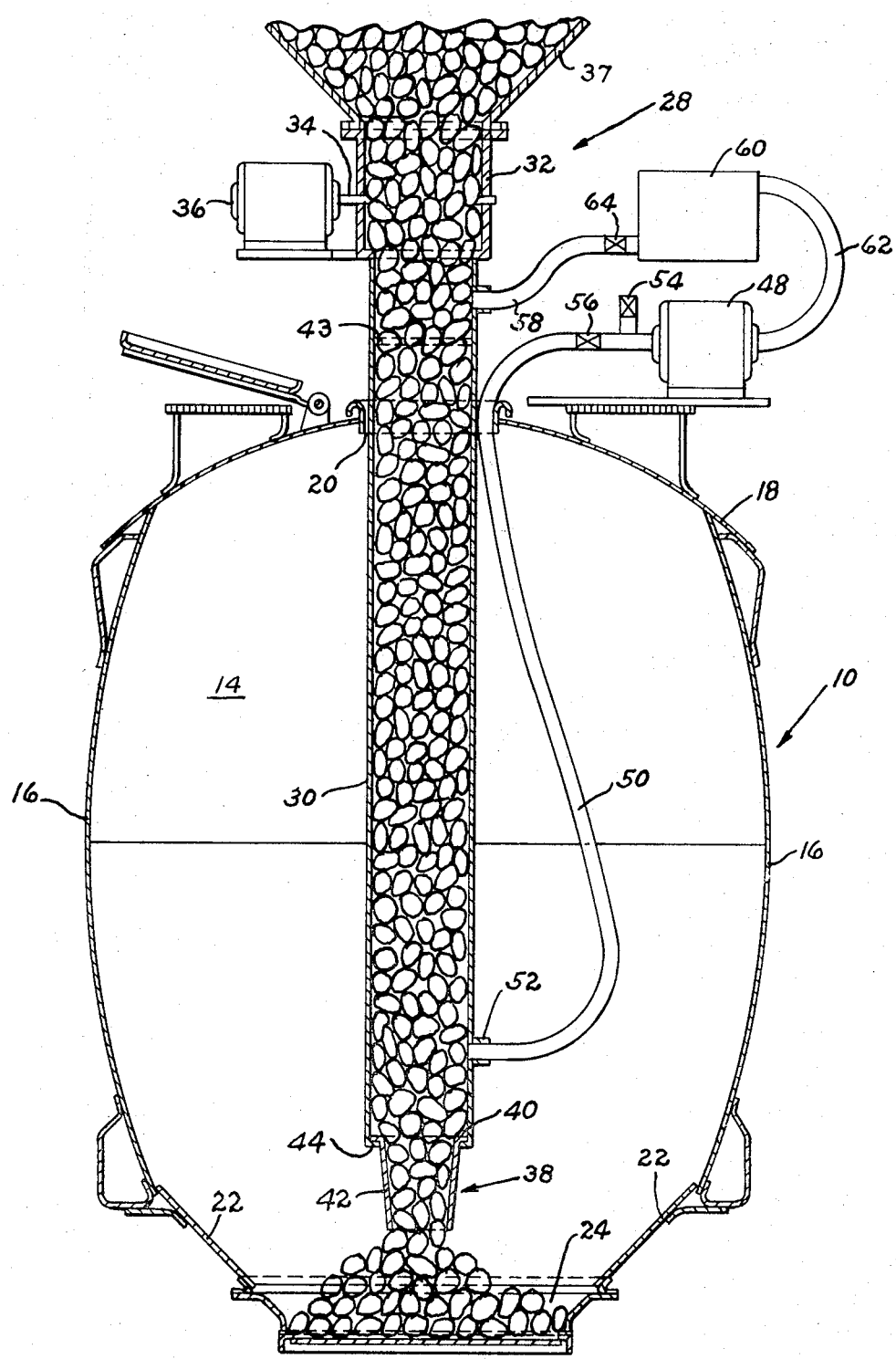

United States Patent

[11] 3,594,847

[72] Inventor Dallas W. Rollins
 St. Charles, Mo.
[21] Appl. No. 863,487
[22] Filed Oct. 3, 1969
[45] Patented July 27, 1971
[73] Assignee ACF Industries, Incorporated
 New York, N.Y.

[54] APPARATUS FOR LOADING PERISHABLE BULK COMMODITIES WITHIN A HOPPER
 7 Claims, 3 Drawing Figs.
[52] U.S. Cl.................................................. 15/306 B,
 141/258, 193/3, 209/139, 214/17 C, 214/41, 302/36
[51] Int. Cl....................................................... B65g 67/06
[50] Field of Search........................................... 214/17 C,
 17 CA, 41; 193/3; 141/258; 209/139; 15/306 R, 306 B

[56] References Cited
UNITED STATES PATENTS
1,021,757 4/1912 Blaisdell........................ 214/17 C 3,147,846 9/1964 Huntoon....................... 214/17 CA Primary Examiner—Robert G. Sheridan
Attorney—Eugene N. Riddle ABSTRACT: Apparatus for loading perishable commodities, such as potatoes, in a hopper and having an elongate chute adapted to fit within a hopper, and a valve within the chute mounted for vertical up and down movement. The valve is normally positioned adjacent the upper end of the chute in a closed position and is pushed down by the potatoes when the potatoes are discharged thereby to minimize the fall of the perishable commodities into the bottom of the hopper. The valve is opened automatically by the potatoes when the downward travel of the valve with the potatoes is restrained at the lower end of the chute. A negative pressure is exerted adjacent the upper end of the chute and holds the valve in its upper position for the initial discharge of the potatoes in the hopper. An upward airflow is provided in the chute during the loading of the potatoes in the hopper and is effective to remove foreign matter, such as dirt or dust, entrained with the potatoes, during the entire loading operation.

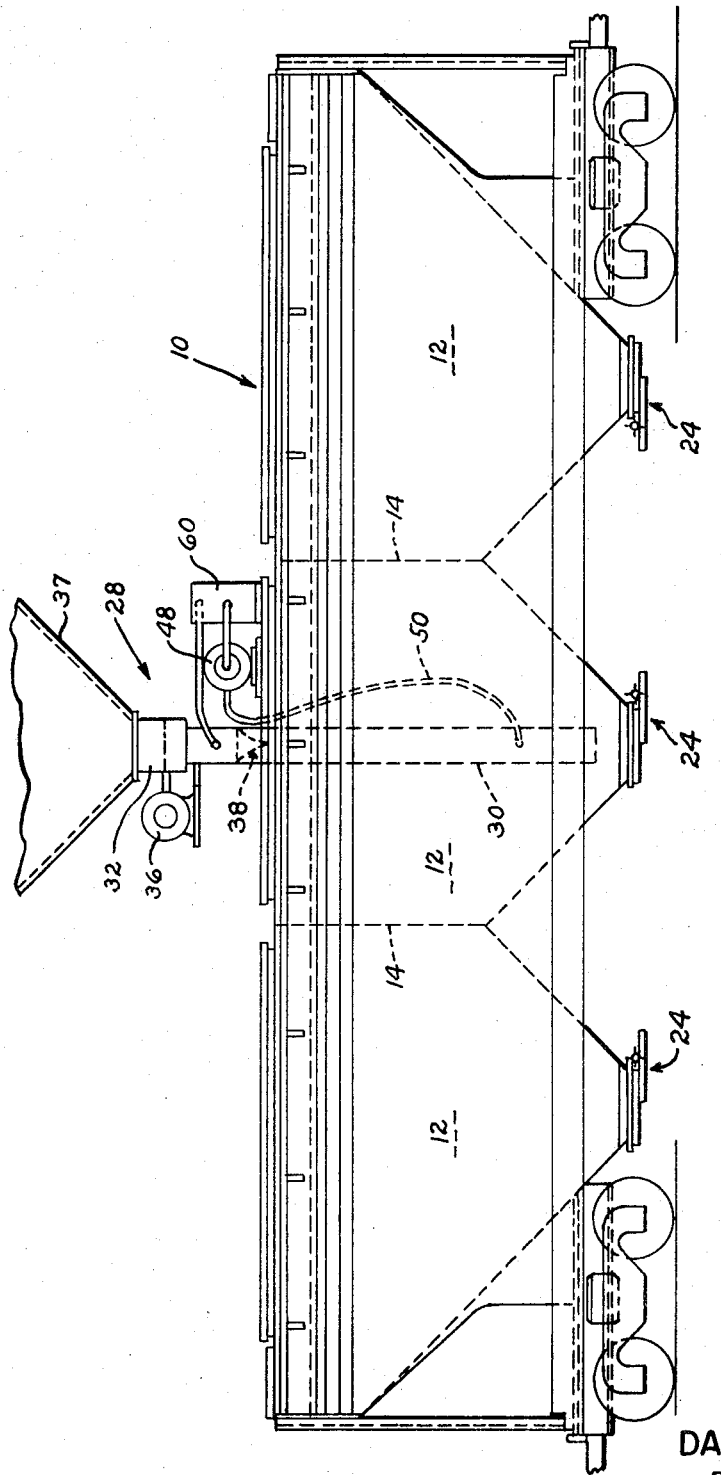
FIG. I.
INVENTOR.
DALLAS W. ROLLINS

APPARATUS FOR LOADING PERISHABLE BULK COMMODITIES WITHIN A HOPPER

BACKGROUND OF THE INVENTION

Various types of loading equipment for railway hopper cars have been employed heretofore, such as canvas chutes and endless conveyors. When canvas chutes are employed the initial fall of the lading or perishable commodity is oftentimes a considerable distance. Endless conveyors are difficult to position within the hatch openings of hoppers and also normally permit the lading, such as potatoes, to fall or drop from the end of the conveyor. Further, none of the present unloading means employed provide any cleaning or removal of foreign matter from the perishable commodities as they are being loaded into the hoppers.

DESCRIPTION OF THE INVENTION

The present invention provides means for loading perishable bulk commodities, such as potatoes, in a covered hopper car with a minimum of damage or bruising of the commodity being loaded. Further, the loading means removes dust, dirt and other foreign matter from the bulk commodity. The loading structure comprising an elongate chute adapted to fit within the hatch opening of a covered hopper car for extending vertically downwardly into the hopper, a valve mounted within the chute for vertical movement up and down the chute, means adjacent the upper portion of the chute for exerting a negative pressure and maintaining the valve adjacent the upper portion of the chute until the potatoes are first discharged into the chute, the valve upon the initial discharge of potatoes into the upper portion of the chute being carried downwardly by the weight of the potatoes adjacent the lower end of the chute and remaining closed until the downward movement of the valve is stopped. The potatoes force the valve to an open position upon the stopping of the valve at its lower position thereby permitting the commodity to be discharged into the hopper with a relatively small fall from the chute.

The invention accordingly comprises the constructions hereinafter described, the scope of the invention being indicated in the following claims.

Figure 2:
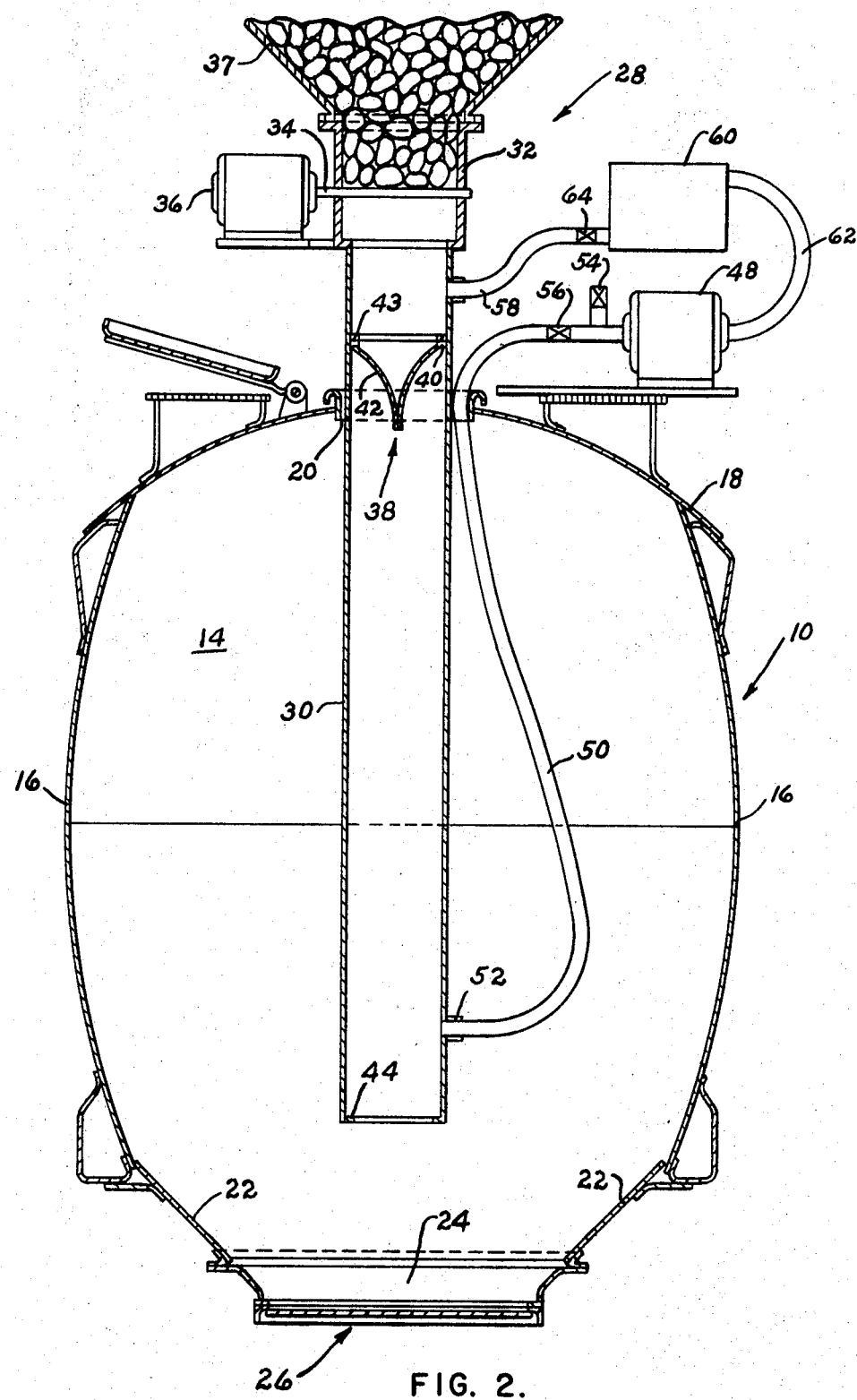

In the accompanying drawings, in which one of various possible embodiments of the invention is illustrated, FIG. 1 is a side elevation of a covered hopper railway car indicating apparatus for loading a perishable bulk commodity within the hatch opening of a hopper;

FIG. 2 is a section of a hopper indicating the loading apparatus thereon immediately before the initiation of the loading operation; and, FIG. 3 is a section view similar to FIG. 2 but illustrating the loading apparatus during the loading of the perishable bulk commodity into the hopper.

Referring now to the drawings, a covered hopper railway car is generally indicated 10 and includes a plurality of hoppers 12 separated by transverse bulkheads 14. Side sheets 16 form the sides of hoppers 12 and a roof 18 extends between side sheets 16. A hatch opening 20 for each hopper 12 is provided in roof 18. Slope sheets 22 extend downwardly to a bottom discharge opening 24 of hopper 12 and a suitable discharge structure generally indicated 26 controls the discharge of lading from opening 24.

Loading apparatus generally indicated 28 comprising an elongate airtight chute 30 having a rotary inlet valve 32 mounted on shaft 34 for rotation and providing an air lock. A motor 36 connected to shaft 34 may be actuated for rotation of valve 32, and suitable vanes form compartments for maintaining a generally airtight seal with the open upper end of chute 30. A load hopper 37 is positioned above inlet valve 32 to feed potatoes into valve 32. A vacuum or negative pressure valve generally indicated 38 is mounted within chute 30 for vertical up and down movement. Valve 38 comprises an outer support ring 40 and a rubber body 42 secured to ring 40 and closing in response to a negative pressure exerted on its upper side. A support stop ring 43 secured to the inner surface of chute 30 adjacent its upper end forms an upper stop for ring 40 and valve 38. A support stop ring 44 at the lower end of chute 30 forms a lower abutment for ring 40 to stop the downward movement of valve 38.

A vacuum pump 48 has a positive pressure line 50 therefrom leading to pressure inlet 52 adjacent the lower end of chute 30. Valve 54 is vented to atmosphere and a line valve 56 is placed in line 50. A vacuum or negative pressure outlet 58 is provided for chute 30 above stop ring 43 and leads to a dirt and dust filter 60 which is connected by line 62 to vacuum pump 48. A valve 64 is placed in outlet line 58 for controlling the flow of air therein.

In operation, a bulk commodity, such as potatoes, is first fed into upper hopper 37 with rotary valve 32 closed. Then, valves 54 and 64 are opened with valve 56 remaining closed, and vacuum pump 48 is actuated. The negative pressure exerted through lines 58 and 62 closes the jaws of rubber valve body 42 of valve 38 and draws valve 38 against stop ring 43. Valve 54 is then closed and motor 36 is actuated for rotating valve 32. As valve 38 is closely adjacent rotary valve 32 the initial fall or drop of the potatoes into valve 38 will not result in damage. The weight of the potatoes forces valve 38 downwardly within chute 30 with the speed of descent of valve 38 being regulated by vacuum pump 48. Also, the negative pressure within chute 30 is controlled by pump 48 and valve 64 so that valve 38 will not open until valve 38 reaches its lower position with stop ring 44 engaging valve 38.

When valve 38 passes inlet 52 and engages stop ring 44 as shown in FIG. 3, valve 56 is opened to equalize substantially the pressure within chute 30 with air being circulated from air inlet 52, upwardly within chute 30, into outlet line 58 to filter 60. Thus, an upward airflow is provided within chute 30. Filter 60 removes any foreign matter entrained in the air being discharged from outlet line 58. Thus, dirt or dust separated from the potatoes in chute 30 is removed by filter 60 and the air is recirculated. As the potatoes fill the bottom of hopper 12, the lower end of chute 12 is raised to permit loading of the entire hopper 12.

What I claim is:

1. A loader particularly for loading bulk commodities into a hopper through a hatch opening of a covered hopper railway car comprising, an elongate chute adapted to fit within the hatch opening for extending vertically downwardly into the hopper, a valve mounted within the chute for vertical movement up and down the chute, means adjacent the upper portion of the chute for exerting a negative pressure thereon and maintaining the valve adjacent the upper portion of the chute when the negative pressure is exerted, and means adjacent the upper portion of the chute for the discharge of bulk commodities into the chute, said valve upon the initial discharge of perishable commodities into the upper portion of the chute being carried downwardly by the weight of the commodities to a position adjacent the lower end of the chute thereby permitting the bulk commodities to be discharged into the hopper with a relatively small fall from the chute.

2. In apparatus for loading perishable bulk commodities into a hopper through a hatch opening of a covered hopper railway car; an elongate chute adapted to fit within the hatch opening for extending vertically downwardly into the hopper, a valve mounted within the chute for vertical movement up and down the chute and responsive to a negative pressure for closing, means for exerting a negative pressure adjacent the upper portion of the chute and maintaining the valve in a closed position adjacent the upper portion of the chute when the negative pressure is exerted, means adjacent the upper portion of the chute for the discharge of commodities into the chute, said valve upon the initial discharge of perishable commodities into the upper portion of the chute being carried downwardly by the weight of the commodities to a position adjacent the lower end of the chute, and stop means to stop the downward travel of the valve within the chute with the bulk commodities automatically opening the valve upon stopping of the valve thereby permitting the bulk commodities to be discharged into the hopper with a relatively small fall from the chute.

3. A loader particularly for loading perishable bulk commodities into a hopper through an upper opening in the hopper, an elongate chute adapted to fit within the upper opening for extending vertically downwardly into the hopper, a valve mounted within the chute for vertical movement up and down the chute between upper and lower positions, means for maintaining the valve in a closed upper position adjacent the upper portion of the chute means adjacent the upper portion of the chute for the discharge of commodities into the chute with the valve in its upper position, said valve upon the initial discharge of perishable commodities into the upper portion of the chute moving downwardly to a position adjacent the lower end of the chute, and stop means to stop the downward travel of the valve within the chute, said valve opening upon stopping of the valve at its lower position thereby permitting the commodities to be discharged into the hopper with a relatively small fall from the chute.

4. Apparatus for loading bulk commodities into a hopper through an upper opening in the hopper, an elongate chute adapted to fit within the upper opening for extending vertically downwardly into the hopper, a valve mounted within the chute for vertical movement up and down the chute between upper and lower positions, means for maintaining the valve in a closed position adjacent of the chute for the discharge of bulk commodities into the chute with the valve in its upper positions, said valve upon the initial discharge of perishable commodities into the upper portion of the chute moving downwardly adjacent the lower end of the chute, stop means to stop the downward travel of the valve within the chute, said valve opening upon stopping of the valve at its lower position thereby permitting the bulk commodities to be discharged into the hopper with a relatively small fall from the chute, and means providing an upward flow of air within the chute with the air being removed from the chute adjacent its upper end thereby to remove any foreign matter separated from the bulk commodities.

5. Apparatus for loading bulk commodities into a hopper as specified in claim 4 wherein an air inlet is provided adjacent the lower end of the chute for providing the upward airflow within the chute.

6. Apparatus for loading bulk commodities into a hopper as specified in claim 5 wherein a fluid conduit connects the air outlet adjacent the upper end of the chute with the air inlet adjacent the lower end of the chute for providing a continuous recirculation of air, and filter means are provided in said fluid conduit for the removal of foreign matter.

7. Apparatus for loading bulk commodities into a hopper as specified in claim 4 wherein said means adjacent the upper portion of the chute for the discharge of bulk commodities into the chute comprises an air lock to maintain a generally airtight seal at the upper end of the chute.